United States Patent
Van Lydegraf

(10) Patent No.: US 9,324,130 B2
(45) Date of Patent: Apr. 26, 2016

(54) FIRST IMAGE AND A SECOND IMAGE ON A DISPLAY

(75) Inventor: Curt N. Van Lydegraf, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 13/878,667

(22) PCT Filed: Oct. 11, 2010

(86) PCT No.: PCT/US2010/052207
§ 371 (c)(1),
(2), (4) Date: Apr. 10, 2013

(87) PCT Pub. No.: WO2012/050561
PCT Pub. Date: Apr. 19, 2012

(65) Prior Publication Data
US 2014/0092124 A1    Apr. 3, 2014

(51) Int. Cl.
| | | |
|---|---|---|
| *G06F 3/041* | (2006.01) | |
| *G06T 3/40* | (2006.01) | |
| *G06T 3/20* | (2006.01) | |
| *G06F 3/0488* | (2013.01) | |

(52) U.S. Cl.
CPC . *G06T 3/20* (2013.01); *G06F 3/041* (2013.01); *G06F 3/0488* (2013.01); *G06T 3/40* (2013.01)

(58) Field of Classification Search
CPC ............... G09G 5/14; G09G 2340/10; G09G 2340/125; G09G 3/04; G06T 11/60; G06T 11/203; H04N 5/44504; G06K 15/02; G06K 2215/0042; G06K 2215/0045
USPC .......................................... 345/620, 629, 173
See application file for complete search history.

(56) References Cited

U.S. PATENT DOCUMENTS

| | | | |
|---|---|---|---|
| 6,388,684 B1 | 5/2002 | Iwamura et al. | |
| 7,194,147 B2* | 3/2007 | Kovvuri et al. | 382/299 |
| 7,705,860 B2* | 4/2010 | Sloo et al. | 345/634 |
| 8,224,120 B2* | 7/2012 | Hamada et al. | 382/290 |
| 8,830,402 B2* | 9/2014 | Lin et al. | 348/581 |
| 2005/0206643 A1* | 9/2005 | Endoh et al. | 345/428 |
| 2006/0221237 A1 | 10/2006 | Min et al. | |
| 2007/0109274 A1* | 5/2007 | Reynolds | 345/173 |
| 2008/0178126 A1* | 7/2008 | Beeck et al. | 715/863 |
| 2008/0309775 A1* | 12/2008 | Mutsuro et al. | 348/220.1 |
| 2010/0026721 A1 | 2/2010 | Park et al. | |
| 2010/0074536 A1 | 3/2010 | Hamada et al. | |
| 2010/0115145 A1* | 5/2010 | Banerjee et al. | 710/10 |
| 2010/0162163 A1 | 6/2010 | Wang et al. | |
| 2010/0182247 A1* | 7/2010 | Petschnigg et al. | 345/173 |
| 2010/0185989 A1* | 7/2010 | Shiplacoff et al. | 715/856 |
| 2010/0295803 A1* | 11/2010 | Kim et al. | 345/173 |

(Continued)

FOREIGN PATENT DOCUMENTS

| | | |
|---|---|---|
| CN | 101672648 A | 3/2010 |
| JP | 2008-269044 A | 11/2008 |

OTHER PUBLICATIONS

Evening, Martin; Photoshop CS3 for Photographers; 2007; pp. 72, 218, 367.*

(Continued)

*Primary Examiner* — Todd Buttram
(74) *Attorney, Agent, or Firm* — HP Inc Patent Department

(57) ABSTRACT

A first image and a second image of the first image. A display to display the first image and the second image. A sensor to detect an input relative to the display. A processor to determine a task to perform based on the input relative to the first image or the second image on the display.

12 Claims, 4 Drawing Sheets

(56) References Cited

U.S. PATENT DOCUMENTS

| | | | |
|---|---|---|---|
| 2011/0087998 A1* | 4/2011 | Samadani et al. | 715/838 |
| 2011/0164062 A1 | 7/2011 | Nakamura et al. | |
| 2012/0035934 A1* | 2/2012 | Cunningham | 704/260 |
| 2013/0194289 A1* | 8/2013 | Snow | 345/581 |

OTHER PUBLICATIONS

"Apple iPad—Steve Jobs Keynote", <http://www.youtube.com/playlist?list=PL5DC4C74DEEA3AE93>, Publication Date: Jan. 27, 2010.

"Project: LogiNoki", < http://metku.net/index.html?path=mods/loginoki/index_eng > Publication Date: Jul. 25, 2006.

htttps://maps.google.com/, retrieved on Apr. 9, 2013.

International Search Report and Written Opinion, PCT Application No. PCT/US2010/052207, Mailed Jul. 25, 2011, pp. 9.

Sanneblad, et al; "Ubiquitous Graphics: Combining Hand-held and Wall-size Displays to Interact with Large Images", < http://www.sics.se/fal/publications/2006/ubigraphics-AVI.pdf > Publication Date: May 23-26, 2006.

* cited by examiner

FIRST IMAGE AND A SECOND IMAGE ON A DISPLAY

BACKGROUND

A touch enabled display can allow a user to provide an input to a system connected to a touch enabled display by contacting the touch enabled display. The touch enabled display can use sensors to detect a touch on the display for example resistive, capacitive, or optical. A system can determine from location of a touch and generate an input based on the location of the input.

BRIEF DESCRIPTION OF THE DRAWINGS

Some embodiments of the invention are described with respect to the following figures.

DETAILED DESCRIPTION

Figure 1:
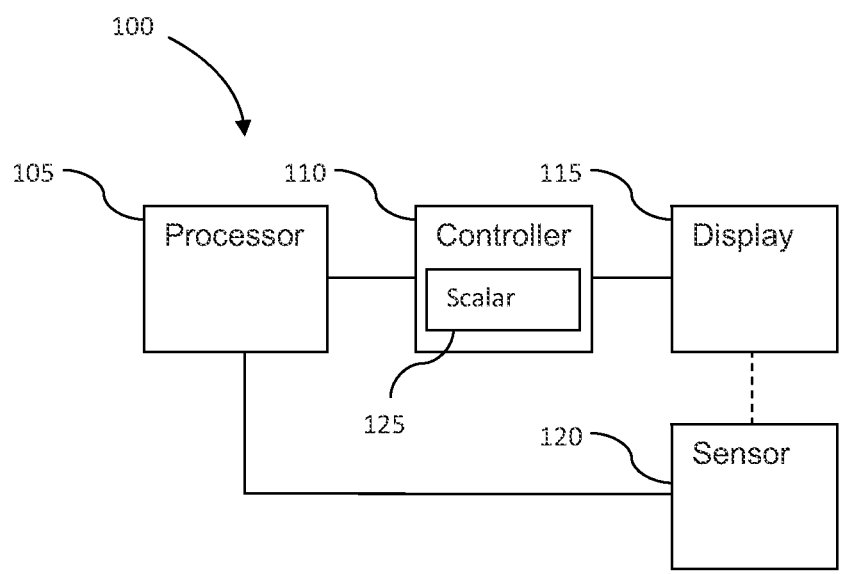
FIG. 1 is a block diagram according to an example embodiment of the invention.

An input enabled display can be used in a presentation. A input enabled display may use a projector to generate a first image or may use a panels such as an liquid crystal display (LCD), cathode-ray tube (CRT), plasma, organic light amending diode (OLED) or another technology to display a first image. Using a projector to generate the first images for an input enabled display may allow the display to be scaled to the room where the presentation is given. For example the projector may be able to project a first image on a screen that is more than 3 meters tall. Multiple panels may be used to display images for an input enabled display, the panels may be adjacent to one another wherein each panel displays a portion of the first image.

An input enabled display may be for example vertically oriented. If an input enabled display is taller than the reach of a user it may present a problem if the user cannot reach a portion of the input enabled display. For example a graphical user interface may be displayed on the input enabled display and the graphical user interface may have a menu bar along the top of the graphical user interface. The menu bar along the top of the graphical user interface may not be accessible to a user if for example the input enabled display is taller than the user's reach. An input enabled display may be for example on a table that may include portions of the display that are out of the reach of the user. The table may be horizontal or angled toward the user such as a drafting table.

An input, on the input enabled display, such as a touch of the display, a gesture on the display, a gesture in front of the display, a pose in front of the display or another type of input may not be provided by the user if the portion of the graphical user interface to receive the input is not accessible for example if the graphical user interface is out of a user's reach. The touch of the display may be contact with the display without movement, a gesture on the display may be contact with the display with movement, a gesture in front of the display may be movement of an object such as a hand, and a pose in front of the display may be an object such as a hand without movement.

A graphical user interface may include an attribute along the bottom of the display. An attribute can be a feature that is associated with a task if an input is detected such as menus, icons, a virtual keyboard, window or another attribute. If an application is executed on a touch display that has an attribute out of the reach of the user of the graphical user interface the user may not use the application if the size of the display makes it impractical to use.

A user should have access to the entire graphical user interlace. The graphical user interface may be a first image displayed on the display. The first image can be scaled to create a second image of the first image so that the user can access the graphical user interface from the second image.

In one embodiment, a system can include a controller to generate a first image and a second image of the first image. A display can display the first image and the second image. A sensor can detect an input relative to the display. A processor can determine a task to perform based on the input relative to at least one of the first image and the second image if the first image and the second image are displayed on the display.

With reference to the figures, FIG. 1 is a block diagram according to an example embodiment of the invention. A system 100 can include a controller 110 to generate a first image. The controller 110 can include a scalar 125. The controller 110 can generate a second image of the first image. The controller 110 may be for example a graphics processing unit.

A display 115 can display the first image and the second image. The display 115 may be for example an LCD, CRT, OLED, digital light processor (DLP) or another display technology. The display 115 may be multiple display panels, for example the display may be more than one LCD panel.

A sensor 120 can detect an input relative to the display 115. The sensor 120 can be for example a resistive sensor, a capacitive sensor, an optical sensor, an acoustic sensor, depth sensor or another sensor that can detect an input on a display. The sensor 120 maybe in the same enclosure as the display 115 or maybe separate from the display 115. The sensor 120 can be connected to the system 100 through for example a universal serial bus (USB) connection, a digital video interface (DVI), or another type of data connection.

A processor 105 can determine a task to perform based on the input relative to the first image or the second image on the display 115. The sensor can provide data of the input for example the data may be an x-coordinate and y-coordinate of a contact with the display 115. If the sensor provides a z-coordinate the input may be a pose or a gesture in front of the display. A gesture can be movement of an input over time. The first image in the second image on the display 115 may have different attributes that can perform different tasks if a user interacted with them. An attribute can be for example windows, menus, icons, virtual keyboards or other attributes. The processor 105 can determine from the data provided by the sensor 120 if the input was an interaction with one of the attributes of a first image. The processor 105 can then perform a task associated with the attribute of the first image. For example the task may be to open a menu item, execute an application and associated with an icon, select a window, or perform other tasks associated with an attribute.

The second image of the first image can include attributes that are also in the first image. For example if the first image includes an icon associated with executing an application the second image can include a scaled version of the icon associated with executing the application.

FIG. 2 is an input enabled display according to an example embodiment of the invention. FIG. 2a is an input enabled display 115 displaying a first image 230. The first image 230 can be a graphical user interface, a portion of a graphical user interface or another image. FIG. 2b is an input enabled display 115 displaying a first image 230 and a second image 235. The second image can be a lower resolution than the first image. A display may have a number of pixels per centimeter and to scale the first image the number of pixels in the second image is different from the number of pixels in the first image. For example if the first image has 1920 pixels across the second image may have 192 pixels across and may be $\frac{1}{10}^{th}$ the width of the first image when the first image and the second image are displayed on the display. The second image may have the same width to height ratio as the first image. If the first image has a width to height of 16 by 9 then the second image may have a width to height ratio of 16 by 9. The controller may change the width to height ratio of the second image 235 to a different ratio than the first image 230.

The controller can replace a first portion of the first image 230 with the second image 235. A second portion of the first image 230 is the remaining portion of the first image 230 that is not replaced on the display with the second image 235. The first portion of the first image 230 that is replaced by the second image 235 may be changed.

Figure 2A:
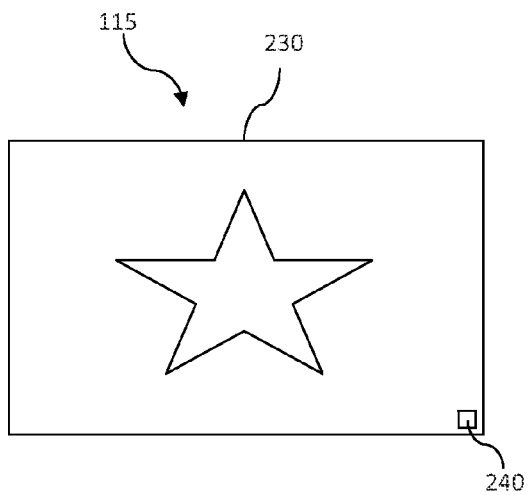
FIG. 2 is an input enabled display according to an example embodiment of the invention.
Figure 2B:
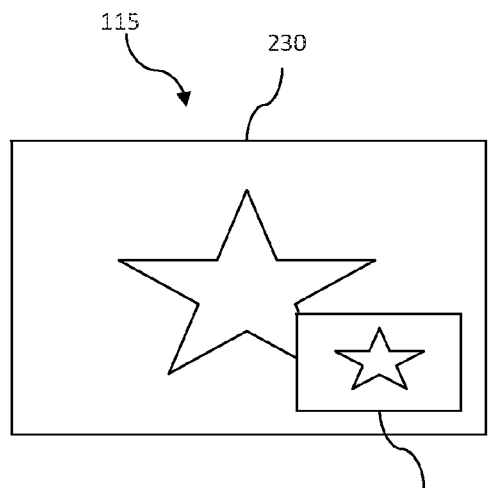
Figure 2C:
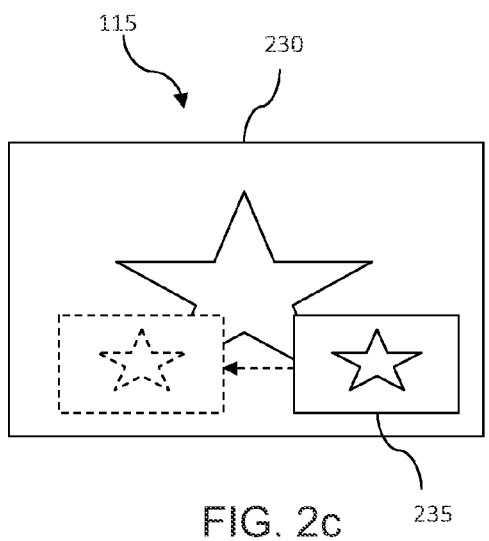

FIG. 2c is an input enabled display 115 that includes a second image 235 that can be moved on the display 115. The second image 235 may be in a window on the display 115. The window of the second image 235 may be moved so that it is on top of different part of the first image 230. A user may move the second image 235 on the display so that it is not replacing a portion of the first image 230 that is being viewed.

An interface can turn on or turn off the second image 235. The interface can be a physical switch or button, an icon on the display 115 or another interface. If the interface is an icon 240 it may be in a position that allow a user to always reach the interface to turn on the second image 235.

If the second image is turned on the controller can determine the location of the display to display the second image. The controller may be configured to always put the second image 235 at the bottom of the display to allow the user to reach the second image 235. The user can move or change the size of the second image after it is displayed. The controller may determine the location to display the second image on the display based on a previous location or previous size of the second image 235. The controller may also determine the location of the second image 235 based on inputs to the first image 230. For example if there is an input on the left half of the display 115 and then the interface turns on the second image 235 then the second image may be on the left half of the display 115.

Figure 2D:
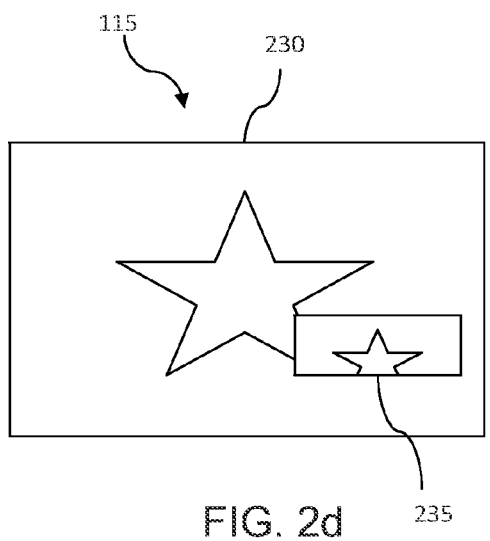

FIG. 2d is an input enabled display 115 that includes a second image 235. The second image 235 can be manipulated such as by cropping the second image, zooming the second image, rotating, flipping or another manipulation. Cropping the second image 235 can allow access to the portion of the second image 235 that is displayed while the area cropped from the second image allows more of the first image 230 to be displayed on the display 115. For example if a user is only trying to access a menu on the top of the first image 230 the user can crop the bottom of the second image 235.

Figure 3:
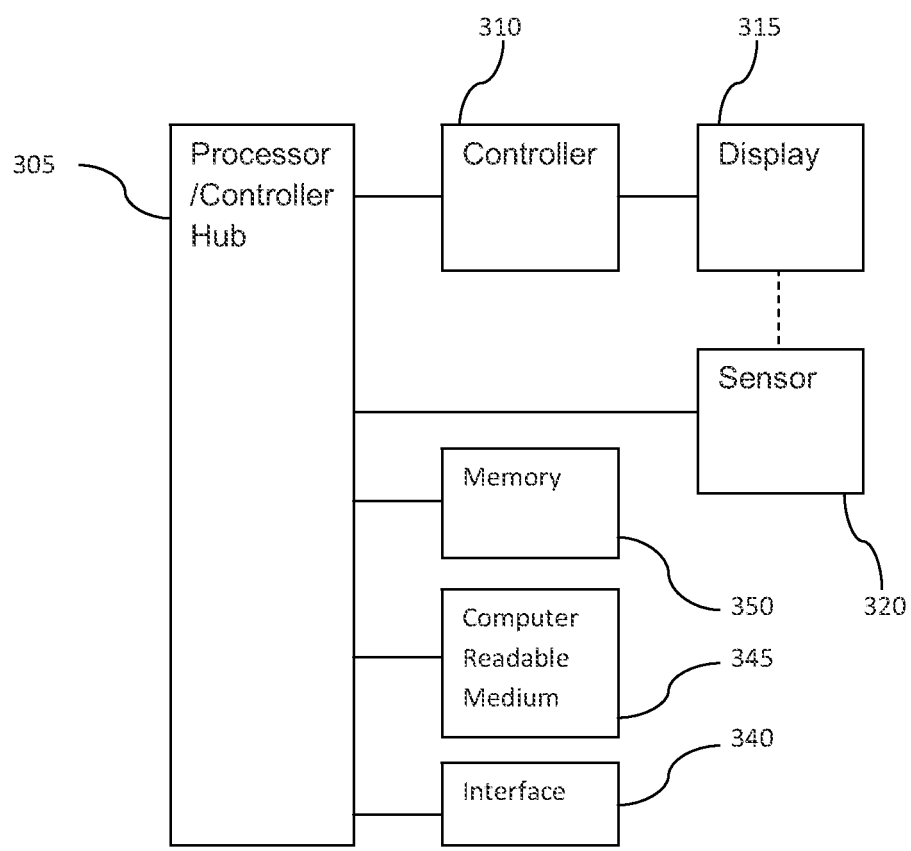
FIG. 3 is a block diagram of a computing system according to an example embodiment of the invention.

FIG. 3 is a block diagram of a computing system according to an example embodiment of the invention. The processor/controller hub 305 can be a processor to process data from various software. The processor/controller hub 305 can in a single package or multiple packages. The processor/controller hub 305 can be coupled to memory for example a volatile memory such as a random access memory (RAM) or a nonvolatile memory such as flash memory. The processor/controller hub 305 can be connected to an interface 340. The interface 340 can be used to turn on or turn off the second image.

The processor/controller hub 305 can be connected to a computer readable medium 345. The computer readable medium 345 can be a hard drive, an optical drive, a solid state drive or another computer readable medium 345. The computer readable medium 345 can include code that if executed by the processor 305 determine from data from a sensor 320 if there is an input to the display 315. The processor 305 can perform a task based on the input determined.

Figure 4:
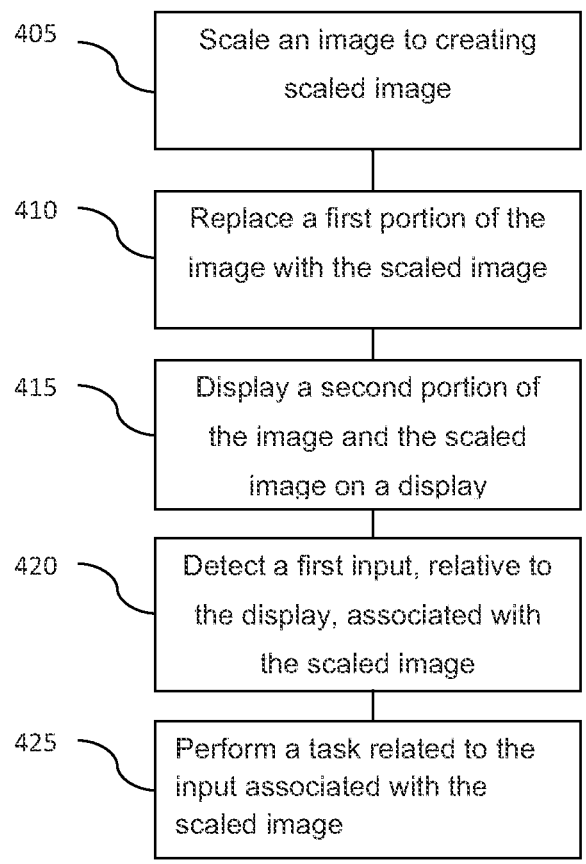
FIG. 4 is a flow diagram of a method according to an example embodiment of the invention.

FIG. 4 is a flow diagram of a method according to an example embodiment of the invention. A first image can be scaled to create second image at 405. The second image may be created by a controller. A first portion of the first image can be replaced with the second image at 410. The location of the second image on the display determines the portion of the first image that is replaced. The location of the second image can be changed causing the first portion of the first image to change. A second portion of the first image and the second image can be displayed on a display at 315. The second portion of the first image is the portion of the first image that is displayed with the second image on the display.

A first input can be detected at 420. The first input can be relative to the display and associated with the second image. The input can be detected by a sensor. The sensor data can be processed by a processor. A task related to the input associated with the second image can be performed at 425. The task related to the input can be for example to execute an application or perform another task.

In one embodiment inputs associated with the second portion of the first image can be rejected. For example if an input is detected on the display at a location where the first image is displayed the input may be rejected if the second image is displayed on the display to prevent accidental inputs on the first image if the input was intended for the second image.

In one embodiment inputs associated with the second image can be rejected. For example if an input is detected on the display at a location where the second portion of the first image is displayed the input may be rejected if the second image is displayed on the display to prevent accidental inputs on the second image if the input was intended for the first image.

A second input associated with the second portion of the first image can be detected causing the second image to be removed from the display and to display the first portion of the first image if the second input transitions from being associated with the second portion of the first image to the second image. For example some inputs such as drawing a line require the input to change locations. The location of an input may change from a location on the display that is on the second portion of the first image and change locations to the second image. As the location of the input changes from the second portion of the first image to the second image the second image may be turned off and so that the first portion of the first image is visible or the second image may be moved to another location on the display.

A machine readable medium can include instructions that if executed cause a controller to create a second image from a first image. The instructions can embed the second image in the first image to create an embedded second image. The instructions can display the embedded second image with the first image. The embedded second image may be removed and the first image displayed without displaying the second image.

The instructions on the computer readable medium can cause the processor to process data from a sensor associated with the display to determine an input on the embedded second image. The data from the sensor can be processes to determine a location on the display.

The location can be used to determine a task to perform. The task can be associated with the input on the embedded second image, for example if the input is at the location of an icon on the second image that would execute a task and the data from the sensor indicates the location of the icon then the processor can execute the task.

The processor may process instructions that arbitrate between an input on the first image and an input on the embedded second image. The arbitration between an input on the first image and the embedded second image can determine if the task that will be performed is associated with a location on the first image or a location on the second image. A location on the display may be associated with both the first image and the second image and the processor can determine which of the first image and the second image is displayed at the location of the input on the display. The task that is performed by the processor is determined by which of the first image and the second image is display at the location of the input on the display.

The techniques described above may be embodied in a computer-readable medium for configuring a computing system to execute a method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fail within the true spirit and scope of the invention.

What is claimed is:

1. A presentation system comprising:
    a touch-sensitive display;
    a processor; and
    a memory resource storing instructions that, when executed by the processor, cause the processor to:
        generate a first graphical user interface (GUI) for display on the touch-sensitive display;
        in response to a first user input, generate a second GUI to overlay a portion of the first GUI, the second GUI comprising a scaled down version of the first GUI;
        in response to generating the second GUI to overlay the portion of the first GUI, disable touch response functions on the first GUI;
        receive user inputs on the second GUI; and
        perform a number of tasks according to the user inputs and display representations of the performed tasks on the first GUI.

2. The presentation system of claim 1, wherein the first user input corresponds to a touch input performed on an icon on the first GUI, the icon being selectable to generate the second GUI.

3. The presentation system of claim 1, wherein the first GUI and the second GUI are generated by a projector projecting the first GUI and the second GUI on a number of display panels comprising the touch sensitive display.

4. The presentation system of claim 1, wherein the performed tasks comprise one or more of opening a menu item, executing an application, or selecting a window.

5. The presentation system of claim 1, wherein the executed instructions enable a user to (i) move the second GUI across the first GUI, (ii) change a size of the second GUI, and (iii) crop a portion of the second GUI.

6. The presentation system of claim 1, wherein the executed instructions cause the processor to display the second GUI in a location on the touch-sensitive display based on a previous input.

7. The presentation system of claim 1, further comprising:
    a sensor to detect gesture inputs relative to the display;
    wherein the executed instructions further cause the processor to:
        receive a gesture input comprising an interaction with a displayed attribute of the first GUI, the gesture input being performed without contacting a surface of the touch-sensitive display; and
        in response to the gesture input, perform a task associated with the displayed attribute of the first GUI.

8. The presentation system of claim 1, wherein the executed instructions further cause the processor to:
    receive a drag input on the touch-sensitive display, the drag input transitioning from the second GUI to the first GUI;
    in response to the drag input transitioning from the second GUI to the first GUI, terminate the second GUI.

9. A method comprising:
    generating a first graphical user interface (GUI) for display on a touch-sensitive display;
    in response to a first user input, generating a second GUI to overlay a portion of the first GUI, the second GUI comprising a scaled down version of the first GUI;
    in response to generating the second GUI to overlay the portion of the first GUI, disable touch response functions on the first GUI;
    receiving user inputs on the second GUI; and
    performing a number of tasks according to the user inputs and displaying representations of the performed tasks on the first GUI.

10. The method of claim 9, further comprising:
    receiving a drag input on the touch-sensitive display, the drag input transitioning from the second GUI to the first GUI;
    in response to the drag input transitioning from the second GUI to the first GUI, terminating the second GUI.

11. A non-transitory machine readable medium comprising instructions that, when executed by a processor of a presentation system, cause the processor to:
    generate a first graphical user interface (GUI) for display on a touch-sensitive display;
    in response to a first user input, generate a second GUI to overlay a portion of the first GUI, the second GUI comprising a scaled down version of the first GUI;

in response to generating the second GUI to overlay the portion of the first GUI, disable touch response functions on the first GUI;

receive user inputs on the second GUI; and perform a number of tasks according to the user inputs and display representations of the performed tasks on the first GUI.

12. The non-transitory machine readable medium of claim 11, wherein the executed instructions further cause the processor to:

receive a drag input on the touch-sensitive display, the drag input transitioning from the second GUI to the first GUI;

in response to the drag input transitioning from the second GUI to the first GUI, terminate the second GUI.

* * * * *